United States Patent
Durham et al.

(10) Patent No.: US 10,225,247 B2
(45) Date of Patent: Mar. 5, 2019

(54) BIDIRECTIONAL CRYPTOGRAPHIC IO FOR DATA STREAMS

(71) Applicant: Intel Corporation, Santa Clara, CA (US)

(72) Inventors: David M. Durham, Beaverton, OR (US); Siddhartha Chhabra, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 166 days.

(21) Appl. No.: 14/968,447

(22) Filed: Dec. 14, 2015

(65) Prior Publication Data

US 2017/0171194 A1    Jun. 15, 2017

(51) Int. Cl.
*H04L 29/06* (2006.01)
*G06F 12/14* (2006.01)
(Continued)

(52) U.S. Cl.
CPC ...... *H04L 63/0853* (2013.01); *G06F 12/1408* (2013.01); *G06F 13/28* (2013.01);
(Continued)

(58) Field of Classification Search
CPC . H04L 63/0853; H04L 63/123; H04L 9/3234; G06F 13/28; G06F 12/1408; G06F 2212/1052
See application file for complete search history.

(56) References Cited

U.S. PATENT DOCUMENTS 6,952,770 B1 * 10/2005 Mittal ............... G06F 21/123
                                                        709/229
9,420,049 B1 *  8/2016 Talmor ................. H04L 67/02
(Continued)

FOREIGN PATENT DOCUMENTS

WO       2013130632        9/2013

OTHER PUBLICATIONS

Burger, T. W., "Intel Virtualization Technology for Directed I/O (VT-d): Enhancing Intel platforms for efficient virtualization of I/O devices", Intel, [Online]. Retrieved from the Internet: <URL: https://software.intel.com/en-us/articles/intel-virtualization-technology-for-directed-io-vt-d-enhancing-intel-platforms-for-efficient-virtualization-of-io- . . . , (Mar. 5, 2012), 15 pgs.

(Continued)

*Primary Examiner* — Samson B Lemma
*Assistant Examiner* — Arya Golriz
(74) *Attorney, Agent, or Firm* — Schwegman Lundberg & Woessner, P.A.

(57) ABSTRACT

Various configurations and techniques for enabling bidirectional cryptographic input output (IO) operations with an IO device of a computing system are disclosed herein. In an example, electronic operations of a computing system to enable a secure direct memory access (DMA) transaction including writing information to enable the secure DMA transaction to memory, reading and verifying the information from memory, performing encryption of data from the IO device using the information from memory, and writing encrypted secure data for the secure DMA transaction to the memory. In a further example, the information to enable the secure DMA transaction may include a counter value written by authorized software, and encrypting the secure data using the counter value, to prevent replay of the secure encrypted data by software other than the authorized software.

25 Claims, 7 Drawing Sheets

(51) Int. Cl.
*H04L 9/32* (2006.01)
*G06F 13/28* (2006.01)
*G06F 21/85* (2013.01)
*H04L 9/06* (2006.01)

(52) U.S. Cl.
CPC ............ *G06F 21/85* (2013.01); *H04L 9/0637* (2013.01); *H04L 9/3234* (2013.01); *H04L 63/123* (2013.01); *G06F 2212/1052* (2013.01)

(56) References Cited

U.S. PATENT DOCUMENTS

| | | | | |
|---|---|---|---|---|
| 2003/0053475 | A1* | 3/2003 | Veeraraghavan | H04L 1/22 370/431 |
| 2005/0069139 | A1* | 3/2005 | Higurashi | G06F 21/10 380/284 |
| 2005/0226423 | A1* | 10/2005 | Li | H04L 63/062 380/278 |
| 2007/0150755 | A1* | 6/2007 | Makii | G06F 21/12 713/193 |
| 2008/0320600 | A1* | 12/2008 | Pandiscia | H04L 9/3231 726/27 |
| 2009/0199003 | A1* | 8/2009 | Gerritsen | H04N 7/163 713/172 |
| 2009/0259857 | A1 | 10/2009 | Gehrmann | |
| 2011/0038479 | A1* | 2/2011 | Bilodi | H04L 9/0891 380/45 |
| 2013/0283391 | A1 | 10/2013 | Mangalampalli et al. | |
| 2013/0297948 | A1 | 11/2013 | Lee et al. | |
| 2014/0032828 | A1* | 1/2014 | Khailany | G06F 3/065 711/105 |
| 2014/0149743 | A1 | 5/2014 | Kidron et al. | |
| 2014/0189700 | A1* | 7/2014 | Williams | G06F 13/4027 718/104 |
| 2014/0208109 | A1* | 7/2014 | Narendra Trivedi | H04L 9/0643 713/170 |
| 2017/0006024 | A1* | 1/2017 | Pedersen | H04L 63/0823 |
| 2017/0024568 | A1* | 1/2017 | Pappachan | G06F 13/28 |
| 2017/0302666 | A1* | 10/2017 | Dawoud Shenouda Dawoud | H04L 63/0876 |

OTHER PUBLICATIONS

Hoekstra, Matthew, et al., "Using Innovative Instructions to Create Trustworthy Software Solutions", Intel, (2013), 1-8.
McKeen, Frank, et al., "Innovative Instructions and Software Model for Isolated for Isolated Execution", Intel, (2013), 1-8.
"International Application Serial No. PCT/US2016/061807, International Search Report dated Feb. 9, 2017", 3 pgs.
"International Application Serial No. PCT/US2016/061807, Written Opinion dated Feb. 9, 2017", 5 pgs.
"International Application Serial No. PCT/US2016/061807, International Preliminary Report on Patentability dated Jun. 28, 2018", 7 pgs.

* cited by examiner

BIDIRECTIONAL CRYPTOGRAPHIC IO FOR DATA STREAMS

TECHNICAL FIELD

Embodiments described herein generally relate to the communication and processing of data in computer systems, and in particular, to the secure communication and processing of device input/output (IO) memory operations within a computing system.

BACKGROUND

Computing system architectures have been continuously developed and engineered to improve security operations. However, there is a significant gap involving the security measures currently available within a computing system for IO operations. The security of IO operations within a computing system is often referred to as "Trusted" or "Secure" IO, referring to the concept of ensuring that memory operations being conducted by a device to and from memory are cryptographically secure, such that memory operations are untampered with and unusable by unintended parties.

The security considerations for such trusted IO techniques include: how to provide security in a cost effective way that may apply generically to operations by all devices; how multiple different entities may enable exclusive access to respective IO streams; and how to provide strong security protections to ensure confidentiality, integrity, and anti-replay. Existing solutions that have been attempted for computing device architectures have generally failed to deliver a market acceptable, comprehensive trusted IO solution that addresses all of these considerations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
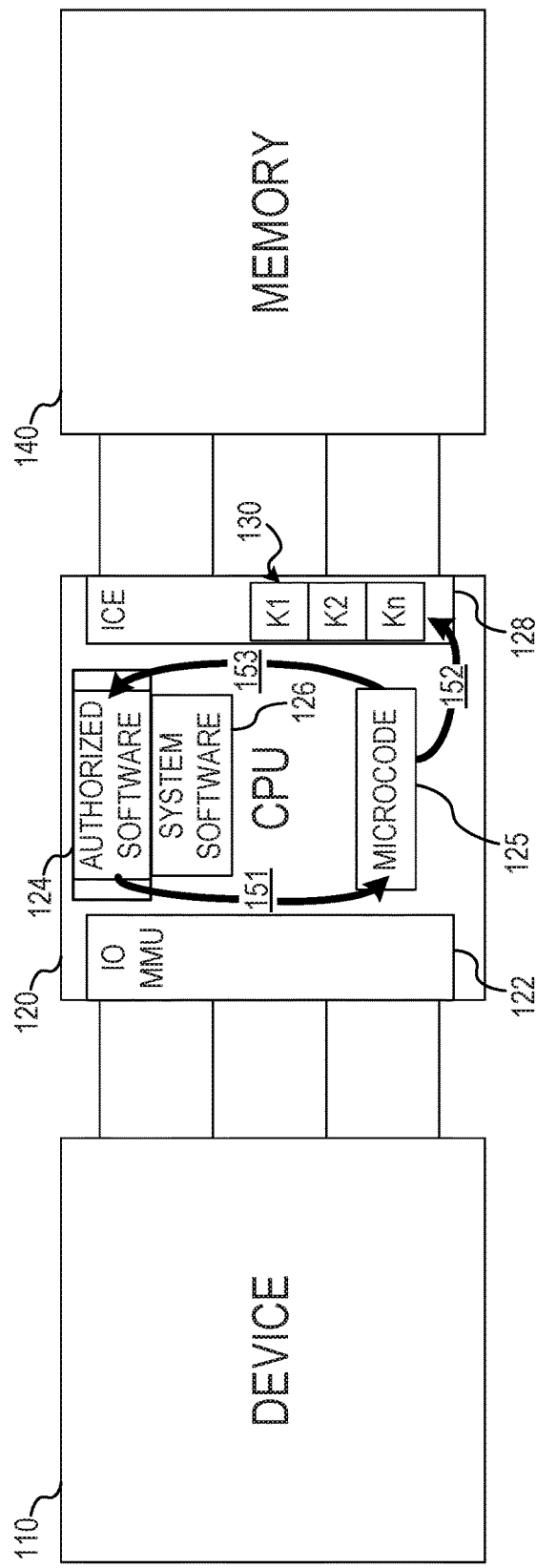
FIG. 1 illustrates a diagram of an example computer architecture implementing a technique for establishing a trusted IO flow, according to an example.

In the following description, methods, configurations, and related devices and apparatuses are disclosed that provide for bi-directional cryptographically secure IO of data streams, enabling multi-party confidentiality, integrity, and ordering of data streams. Specifically, the present disclosure addresses the security considerations of trusted IO with use of a bi-directional protocol for memory access, including direct memory access (DMA) with respective computing system devices. In an example, the presently described bi-directional protocol may be used to allow software to send instructions at cache-line boundaries that a memory controller entity or central cryptography engine (e.g., an IO crypto engine) may interpret and apply in a stateless manner.

As discussed herein, the present techniques enable trusted IO through secure DMA, while protecting cryptographic channels from a replay attack. Replay protection is a difficult problem even with isolated cryptographic channels, as there is a remote chance that the encrypted data could be intercepted or read from memory and replayed at a later time. Thus, while existing techniques have been developed to cryptographically encode device IO data from tampering or plaintext interception, the maintenance of state information presents a far more complex challenge that existing techniques have not addressed.

In an example, a trusted IO communication technique is implemented for communications with a trusted execution environment (TEE) (e.g., software implemented in a secure area such as Intel® Software Guard Extensions (SGX) secure enclaves or ARM® TrustZone® hardware security extensions), through use of a specialized IO crypto engine (ICE). This TEE may be located locally in the computing system or at a remote data service, and the TEE has a trust relationship with the ICE to ensure that authentic IO data is securely exchanged. As a result, the TEE does not need to trust other components of the computing system, such as the operating system or local software, to accomplish trusted IO operations.

In an example, the presently disclosed trusted IO communication techniques are implemented by core-side software memory accesses to a data line in memory that contains metadata to enable the secure DMA transaction. This metadata is written to memory prior to the secure DMA transaction, and then retrieved for use in the secure DMA transaction in response to the device attempting to perform the secure DMA transaction.

In a simplified example, the metadata stored in the data line in memory includes a replay counter value that is written to a memory location. This replay counter value may be a unique value that originates from authorized TEE software to prevent replay of the encrypted data. On a secure device DMA to that same memory location, the metadata is first read to obtain the replay counter value, and the DMA data is encrypted using the replay counter value (e.g., as an encryption tweak, or as a counter with counter mode). Thereafter, the metadata may be overwritten by the now-encrypted DMA data at the same memory location.

In a more detailed example, the metadata stored in the data line in memory contains additional globally unique identifying parameters used in the DMA transaction, such as a byte sequence, a key selector, a device/channel identifier, a replay counter, a token, and like parameters. Upon accesses to memory via DMA from a device that is in a secure mode, the ICE may fetch the data line stored in memory, identify the aforementioned identifying parameters to select a key and obtain the replay counter, and then encrypt the data for the corresponding device using this key and replay counter. Metadata may then indicate that the data line stored in memory should remain encrypted on a subsequent read. Upon the subsequent read of the data from memory, trusted software may decrypt the data, check data integrity, and use the aforementioned counter verify that the data was not replayed, in a generic manner for any device.

In an example, the ICE may first read the metadata from memory on a secure DMA write and then overwrite the same metadata location with device DMA data, encrypted according to the metadata directives. As a result, no additional memory allocation may be needed for maintaining the metadata for the secure DMA transaction. In other examples, the memory allocation and secure DMA write occurs to other memory locations as indicated by the metadata.

As explained in the examples below, the hardware functions performed by the ICE are asymmetric, providing a cryptographic function on a device DMA write to memory, while also sending the resulting encrypted data (e.g., ciphertext) to core software on a subsequent read of the DMA region. This in turn enables software to decouple from the device path and hardware path, so that only authorized software will know the key and be able to decrypt the data. Further, as explained in the examples below, core hardware, microcode, or macrocode provides the attestation services and key exchange services to bind the software keys with the central ICE keys. The core hardware, microcode, or macrocode may also be used to manage an IOMMU (IO Memory Management Unit) to assure the correct device identifier to memory mappings and data flows.

FIG. 1 illustrates a diagram of an example computer architecture implementing a technique for establishing a trusted IO flow, according to an example. As shown in FIG. 1, the computer architecture incudes a device 110, the device 110 coupled to a central processing unit (CPU) 120, and the CPU 120 coupled to a memory 140 (e.g., DRAM or other volatile memory). The CPU 120 further includes an IOMMU 122 adapted to perform memory mapping for DMA IO operations with a plurality of devices (e.g., with the device 110), and an ICE 128 adapted to perform cryptographic memory operations for the DMA IO operations with the plurality of devices (e.g., with the device 110). The CPU 120 further includes microcode 125 to operate specific processor execution instructions, including features of the cryptographic memory operations further discussed herein. It will be understood that numerous functions and components of the device 110, the CPU 120, the memory 140, the IOMMU 122, and the ICE 128 are not depicted or described for simplicity.

Within the CPU 120, various instructions are executed to implement secure and unsecure software of the computing system. Such software may include authorized software 124 (e.g., trusted software) and system software 126 (e.g., system management software included within an operating system), in addition to other components of the operating system and other software applications. For example, the authorized software 124 may be implemented through the use of a trusted zone, secure enclave, or other trusted execution environment, providing a mechanism to execute software by the CPU 120 in an isolated environment protected from the operating system and other software applications. In some example, the trusted execution environment may utilize cryptographic isolation to protect trusted applications from each other and from the other non-trusted software of the computing system.

A series of data flows 151, 152, 153 to begin trusted IO operations are depicted in FIG. 1, through use of the ICE 128 and the IOMMU 122. The data flow 151 starts with platform software requesting secure IO with the device 110 (e.g., through CPU instructions). In an example, the authorized software 124 may request cryptographic access to device data in the CPU 120 using processor microcode/macrocode (e.g., the microcode 125). As an example of software executed using a secure enclave, the authorized software 124 may be authorized as an enclave with rights to access a particular device identifier (Device ID) associated with the device 110, and the operating system may verify the requests to the CPU 120 (to ensure that the CPU 120 also authorizes the transaction).

During the data flow 151 depicted in FIG. 1, the authorized software 124 requests a secret key and key identifier (a KeyID) from the CPU 120 for access to data communicated from the device 110. This secret key will be used to cryptographically encode and decode secure DMA memory entries that will be conducted from the device 110. In another example, the KeyID may be implicitly determined from the ID of the secure device (e.g., a Device ID), thus the Device ID may determine the key that is used to encrypt the DMA device data. In some examples, the Device ID need not be specified in the metadata, as the Device ID may serve as an identifier property for the device channel In another example, a Device ID in combination with a channel ID may together be used to select a key, such as where the channel ID pertains to a particular data flow/session from the device 110.

During the data flow 152 depicted in FIG. 1, the secret key for secure communications with the device 110 is configured in the ICE 128. In an example, the ICE 128 may maintain a list of keys 130 or otherwise determine the keys by use of the KeyID. For example, the CPU 120 may associate a secret key and KeyID in the list of keys 130 stored within the ICE 128 to enable an encrypted DMA communication with the device 110. In another example, in lieu of a stored list of keys, an encryption key may be derived from the KeyID or Device ID. For example, encrypting the KeyID using a master secret key may be used to generate, by calculation, the secret key associated with that KeyID.

During the data flow 153 depicted in FIG. 1, if the authorized software 124 is verified as being authorized (e.g. operating in a secure enclave and having correct permissions to the device 110), the secret key and the KeyID for the secure communications with the device 110 are provided to the authorized software 124. The authorized software 124 uses the secret key and the KeyID for the device 110 to later decrypt data that was securely provided from the device 110. In an example, the secret key and the KeyID for the device 110 are also used by the authorized software 124 to compute integrity check values (ICVs) that the ICE 128 will use to determine whether memory commands were properly configured by the authorized software 124 and untampered with.

The presently described protocol started by data flows 151, 153, 153 is designed to allow the authorized software 124 operating in a trusted execution environment to use counters and tokens in addition to other cryptographic security measures. As discussed in the following examples, this enables the transaction that writes data to memory to not only be encrypted, but also to be tracked (through the use of these counters and tokens) to ensure that a subsequent data read transaction does not occur out of order. Accordingly, the following technique may be used to enable bidirectional (write and read) trusted IO operations of a data transaction with replay protection.

Figure 2:
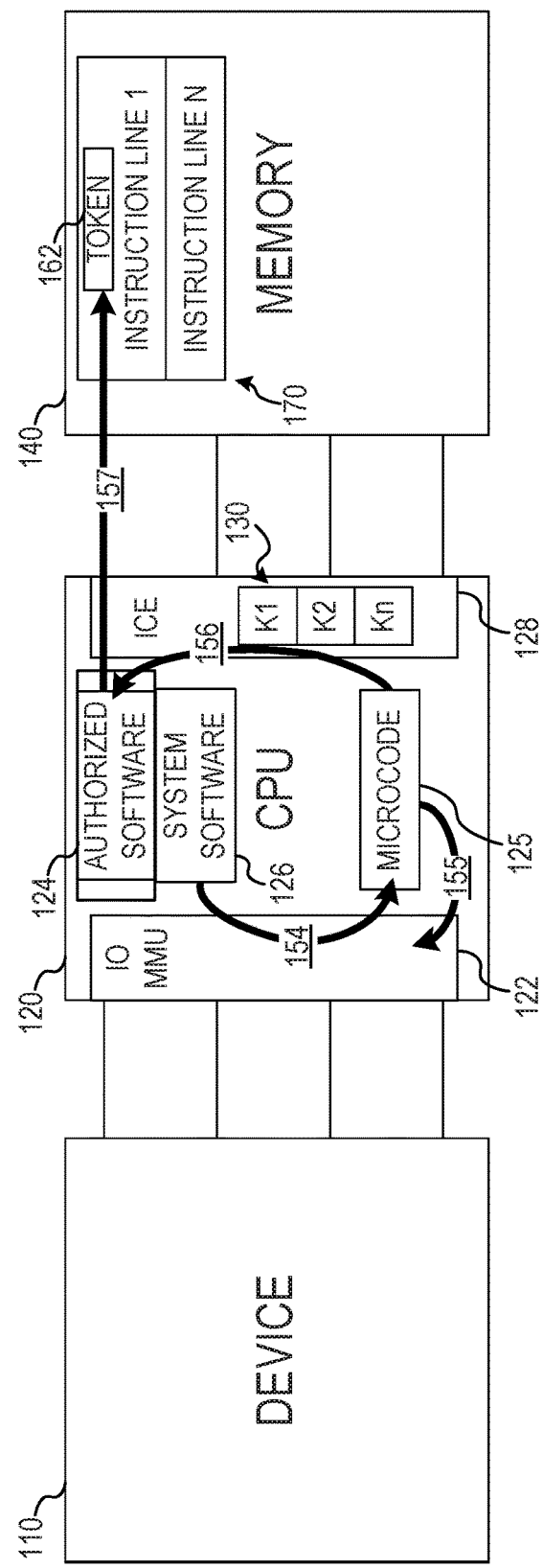
FIG. 2 illustrates a diagram of an example computing system architecture implementing a technique for continuing a trusted IO flow, according to an example.

FIG. 2 illustrates a diagram of an example computing system architecture implementing a technique for continuing a trusted IO flow, according to an example. The diagram of FIG. 2 continues the depiction of the computer architecture of FIG. 1, although it will be understood that modifications to the architecture and data flows of FIG. 1 may also further modify the operations of FIG. 2.

During the data flow 154 depicted in FIG. 2, DMA memory is allocated to the device 110, such as a result of a call from system software 126 handled through the IOMMU 122. Additionally, during the data flow 154, tokens are requested from the CPU 120 (e.g., through instructions in microcode 125) for an associated KeyID and memory page address(es).

In an example, the IOMMU 122 is setup with memory mappings for a particular Device ID of the device 110 using an extension to a set of page tables, such as with use of Intel® Virtualization Technology for Directed I/O (VT-d) page tables. In an example, an authorization token may be used by the OS or a virtual machine monitor/hypervisor to configure the page tables with authorized device to physical memory mappings, to ensure a particular device is authorized to use this memory location. Other techniques may be used to ensure the tables are mapped correctly, to implement a mechanism so that a particular Device ID is associated with specific physical memory addresses.

During the data flow 155 depicted in FIG. 2, the CPU 120 (e.g., through microcode 125) configures the IOMMU 122 to map the device 110 as secure (e.g., to identify the device as trusted), and to use allocated memory addresses for secure DMA operations. In an example, a Device ID for the device 110 is either tagged as secure or non-secure based on a configuration specified in the CPU 120. If the device 110 is indicated as secure as determined by the configuration of the IOMMU 122, then the DMA accesses to memory for the device 110 are likewise identified as secure to the ICE 128. In some examples, the Device ID may also be provided to the ICE 128 as part of the DMA transaction, thus allowing the secret key used to be determined from the secure Device ID.

During the data flow 156 depicted in FIG. 2, the CPU 120 (e.g., through microcode 125) provides a list of tokens for memory pages to the authorized software 124. These tokens are to be used for populating instruction lines in memory that are ready for the secure DMA. As explained in the following examples of FIG. 3, these tokens may be used to validate or authorize that the physical addresses are allowed for the given secret key in a stateless manner. Further, these tokens may be used to demonstrate that the KeyID of the secret key is to be bound to a physical memory address/page frame as seen by the ICE 128. This physical memory address/page frame effectively represents the corresponding device or devices (e.g., device 110) to perform the secure DMA operation with. In a further example, the generation of such tokens may be provided through use of a specialized memory encryption engine (MEE).

During the data flow 157 depicted in FIG. 2, the authorized software 124 configures the DMA-able memory, shown with instruction lines 170. This memory may be directly accessed by the authorized software 124, or it may be copied to the DMA-able regions/pages by a device driver on behalf of the authorized software 124.

Importantly, the contents of the memory as written by the authorized software 124 or on behalf of the authorized software 124 (as a result of the data flow 157) are persevered, and these memory locations will be subsequently read and interpreted by the ICE 128 on secure device DMA memory accesses. Thus, through use of the instruction lines 170, the authorized software 124 is creating packets in memory (e.g., metadata) that will persist or cache a sequence of instructions for the subsequent handling of each instruction line by the ICE 128.

Once read and interpreted as metadata by the ICE, these memory locations may then be overwritten by the DMA data, with the ICE having followed the metadata instructions included therein. In this example, the metadata does not require separate memory allocations, but may reside as part of the same memory data line to be overwritten by DMA data.

The sequence of instructions written to the instruction lines 170 may include a pattern or format that indicates to the ICE 128 that this memory location is special (e.g., indicating that this memory location is correctly configured for secure device accesses). In one example, the instruction line simply includes metadata for a counter value. On a device DMA, the Device ID associated with the DMA transaction may then select/derive a key, and the counter value may be used to modify the encrypted data. The modified encrypted data then may overwrite the counter value at that same memory location with the encrypted DMA data.

In a further example, the instruction line includes metadata for: a token 162 used to determine whether the memory mapping is authorized, a KeyID that the ICE 128 uses to lookup a secret key for encryption of the secure DMA communication, any counter values that the authorized software 124 wishes to use in the encryption to prevent replay, a mask set in software so that the ICE 128 is able to determine which portions of the data should be encrypted, and an ICV (integrity check value or data authenticity code/message authenticity code (MAC)) calculated using the key identified by the KeyID. However, some of these values, such as the mask, may be optional and included for legacy compatibility purposes. The format for the instruction line is further depicted and discussed with reference to the instruction line format 410 of FIG. 4.

At the conclusion of data flow 157 in FIG. 2, the authorized software 124 has written properly formatted instruction lines 170 to the memory 140, with the data stored in the instruction lines 170 including data for the token 162 (the token 162 providing a cryptographic authorization for the counter value and the KeyID of the encryption key, or in other examples, the Device ID of the DMA transaction that is used to determine the encryption key). The format for the token 162 is further depicted and discussed with reference to the token format 420 depicted in FIG. 4.

Further, at the conclusion of data flow 157, the authorized software 124 (or the trusted execution environment operating the authorized software 124) has pre-populated the instruction lines 170 used for secure DMA with counter values to adjust the encryption for the secure DMA. As discussed below, when the ICE 128 proceeds to perform the secure DMA, it will read these counter values in the instruction lines 170 to "pollute" the encryption of the secure DMA data, using counter-mode cryptographic techniques. Because the authorized software 124 is aware of the correct counter value, it may successfully replay and decrypt the resulting encrypted data. Other software, which is not aware of the correct counter value, cannot successfully replay and decrypt the resulting encrypted data.

Figure 3:
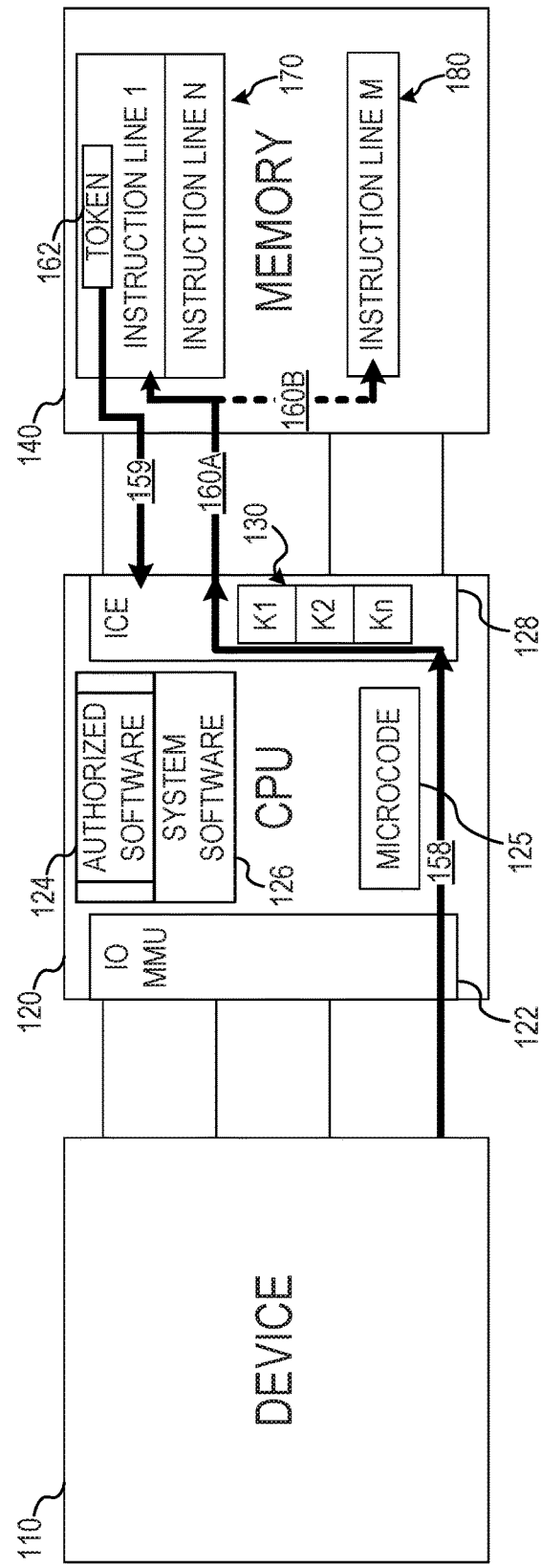
FIG. 3 illustrates a diagram of an example computing system architecture implementing a technique for storing data in a trusted IO flow, according to an example.

FIG. 3 illustrates a diagram of an example computing system architecture implementing a technique for storing data in a trusted IO flow, according to an example. The diagram of FIG. 3 continues the depiction of the computer architecture of FIGS. 1 and 2, although it will be understood that modifications to the architecture and data flows of FIG. 1 or 2 may also further modify the operations of FIG. 3.

As shown, FIG. 3 depicts operations for performing the secure DMA with device 110. Once the DMA-able memory location in memory 140 is properly configured by the authorized software 124 (e.g., with the operations depicted in FIG. 2), secure DMAs with the device 110 may proceed.

During the data flow 158 depicted in FIG. 3, the device 110 attempts a DMA to memory 140. As an initial operation, the IOMMU 122 may translate the memory address based on the device identifier associated with the device 110. When the IOMMU 122 determines that the device 110 is secure (e.g., in a secure, trusted mode as configured by the CPU 120), it signals that the DMA transaction is secure to the ICE 128. In an example, this indication to the ICE 128 may be implemented with a mechanism similar to the non-secure (NS) bit value used in an ARM® TrustZone® configuration.

During the data flow 159 depicted in FIG. 3, the ICE 128 reads and verifies an instruction line from memory 140 for the DMA address. For example, the ICE 128 may read the physical memory location at the instruction lines 170 to statelessly obtain the instructions for handling the secure DMA transaction with the device 110. (In one example, as an alternative to use of a NS bit or similar mechanism, the ICE 128 may first read the memory line that is being DMAed to, for every DMA access, to look for an indication that identifies the DMA memory location as being secure or unsecure).

The ICE 128 may lookup the secret key using the KeyID retrieved from the instruction lines 170, and verify that the ICV, MAC, or other verification value proves the integrity of the retrieved instruction line (e.g., to ensure that mask, counter, key ID, etc. in the instruction lines 170 were not modified). Further, the ICE 128 may verify that the token 162 stored in the instruction lines 170 authorizes the device 110 to perform physical memory access for the corresponding secret key (e.g., based on a Device ID). In an example, this verification is performed using a second key only used by the CPU 120, allowing the token 162 to be encrypted and integrity checked.

In response to successful verification of the token 162, instruction line data, and authorization of the memory access, the secure DMA memory operation may be conducted. During the data flow 160A depicted in FIG. 3, data that is encrypted by the ICE 128 with the secret key is stored inline to the instruction lines 170 (thus, overwriting the DMA transaction data that was previously stored in the instruction lines 170). The ICE 128 encrypts the data from device 110 using the secret key corresponding to the Key ID, and the ICE 128 further adjusts the encryption of the secure DMA data values using the counter value retrieved from the instruction lines 170.

In an example, this adjustment to the encryption with a counter may be performed with the use of "XTS", e.g., an XEX-based tweaked-codebook mode with ciphertext stealing. Due to the cipher's bit diffusion properties, patterns in the plaintext block will be destroyed if the ciphertext is modified or the incorrect tweak value/counter is used to decrypt the ciphertext data. Thus, the absence of expected patterns in the decrypted data constitutes an implicit integrity check that the TEE may use to determine whether there was corruption/modification of the DMA data.

Also in an example, a mask value may be included in the metadata. For example, a mask value retrieved from the instruction lines 170 may identify regions of the DMA operations that are not to be encrypted. Modifications to the encryption process may be accordingly performed to ensure that such sections of data remain unencrypted (e.g., stored in plaintext in memory).

In an example, if any of the integrity checks by the ICE 128 fail for a secure device transaction, then the ICE 128 may notify the CPU 120 of the error condition, and the CPU 120 may indicate the error to software and/or log the error. In an example, the authorized software 124 may use error indications or data logging to securely check for error conditions related to a device's attempted secure DMA transactions. In a further example, error indications or data logging may be implemented through a new CPU instruction that indicates such errors pertaining to authorized software or a trusted environment in a way that compromised system software cannot hide/modify them.

During the alternative data flow 160B depicted in FIG. 3, data that is encrypted by the ICE 128 is stored at an alternative instruction line 180. In an example, the token 162 may also include an alternate address, again as allowed and indicated by operations of the CPU 120, to be associated with a particular cacheline or memory page. This alternate address may be allocated by the OS on behalf of the authorized software 124 to include additional information such as an ICV or MAC for the integrity of the DMA device data, as would be computed by the ICE 128. Additionally, to enable devices to read and write to memory through multiple secure DMA transactions, the alternative instruction line 180 may be used to store the encrypted device data, keeping the instruction lines 170 intact (not overwritten).

The techniques and configurations described above with reference to FIGS. 1, 2 and 3 enable the device 110 to access its own DMA memory space, perform various computations, and move contents around within this DMA memory space, while still affording a completely stateless and device-independent model for secure transactions. Thus, in examples where the encrypted device DMA data is stored at the alternative instruction line 180, and when the device 110 later attempts to read the memory via DMA, the instruction lines 170 will be looked up, the keys determined, and the data at the alternative instruction lines 180 would be returned to the device 110 in its decrypted form.

In the configurations depicted in FIGS. 1, 2, and 3, the IOMMU 122 and the ICE 128 are depicted as separate components. It will be understood that in some examples, the functions of these separate components may be merged together, including with functions of a merged component responsible for tracking device identifiers, secret keys, KeyIDs, and like information used for cryptographic DMA operations. Additionally, although in the examples depicted in FIGS. 1, 2, and 3, the cryptographic key is based on a corresponding device ID of the device 110, other techniques may be implemented in the IOMMU 122 or the ICE 128 for tracking cryptographic information for specific secure (trusted) devices.

Figure 4:
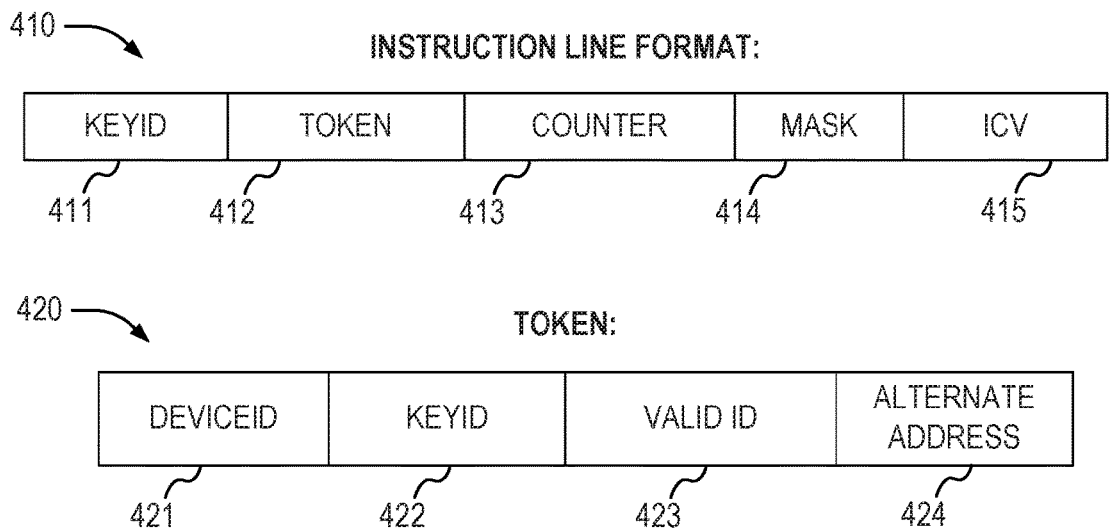
FIG. 4 illustrates an instruction line format and token format used with storing data in a trusted IO flow, according to an example.

FIG. 4 provides an illustration of an instruction line format 410 and token format 420, used with storing data in a trusted IO flow, according to an example. The instruction line format 410 may be used as a format for the data stored in the instruction lines 170 referenced in FIGS. 2 and 3, and the token format 420 may be used as a format for the data stored in the token 162 referenced in FIGS. 2 and 3.

As depicted, the instruction line format 410 may include a key identifier (KeyID) 411, a token 412, a counter 413, a mask 414, and an ICV 415. As also depicted, the token format 420 (e.g., for use as the token 412) may include a device identifier (Device ID) 421, a key identifier (KeyID) 422 (e.g., of the same value as the key identifier 411), a valid identifier 423 (e.g., an identifier to allow reassignment of devices to different TEEs, used to validate whether a particular transaction is valid), and an alternate memory address 424 (e.g., indicating the memory address(es) of the instruction lines 180). In some examples, the token format 420 does not include the alternate memory address 424, or may provide the alternate address as a blank or null field in cases where the secure DMA storage is not provided to an alternate address. In another example, the device identifier 421 may be substituted for a physical memory address indicating the memory address(es) of the instruction lines 170 that is associated with the particular device to perform the secure DMA operations with.

Figure 5:
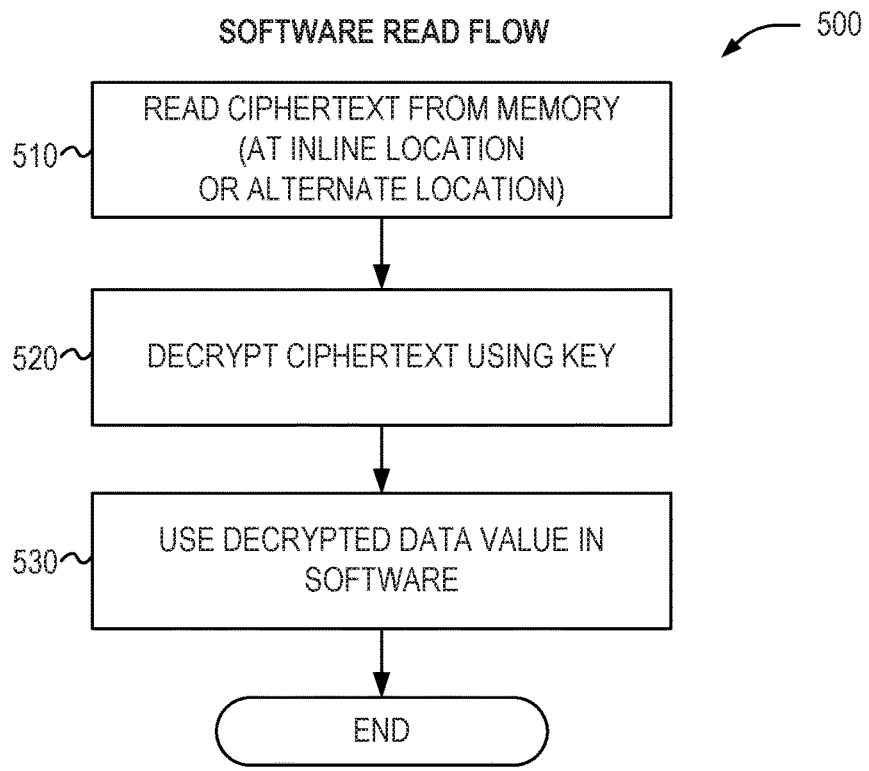
FIG. 5 illustrates a flowchart of a software read flow adapted for use with the presently disclosed trusted IO techniques, according to an example.

FIG. 5 illustrates a flowchart 500 of a software read flow, adapted for use with the presently disclosed trusted IO techniques, according to an example. As shown, the following operations of flowchart 500 may be implemented by operations of a computing system in accordance with the configuration of FIGS. 1 to 3 to implement reads of secure DMA data, although the technique of flowchart 500 may also be used in other configurations.

As depicted, the operations of flowchart 500 include reading the encrypted data (e.g., ciphertext) from memory (operation 510). This may include accessing the encrypted data at an inline memory location used to receive the trusted IO DMA, or at an alternate memory location used to write the trusted IO DMA operation, as discussed above. Upon receipt of the encrypted data from memory, the software application may decrypt the encrypted data using the secret key (operation 520). The software application may proceed to use the decrypted data value in software operations (operation 530).

Figure 6:
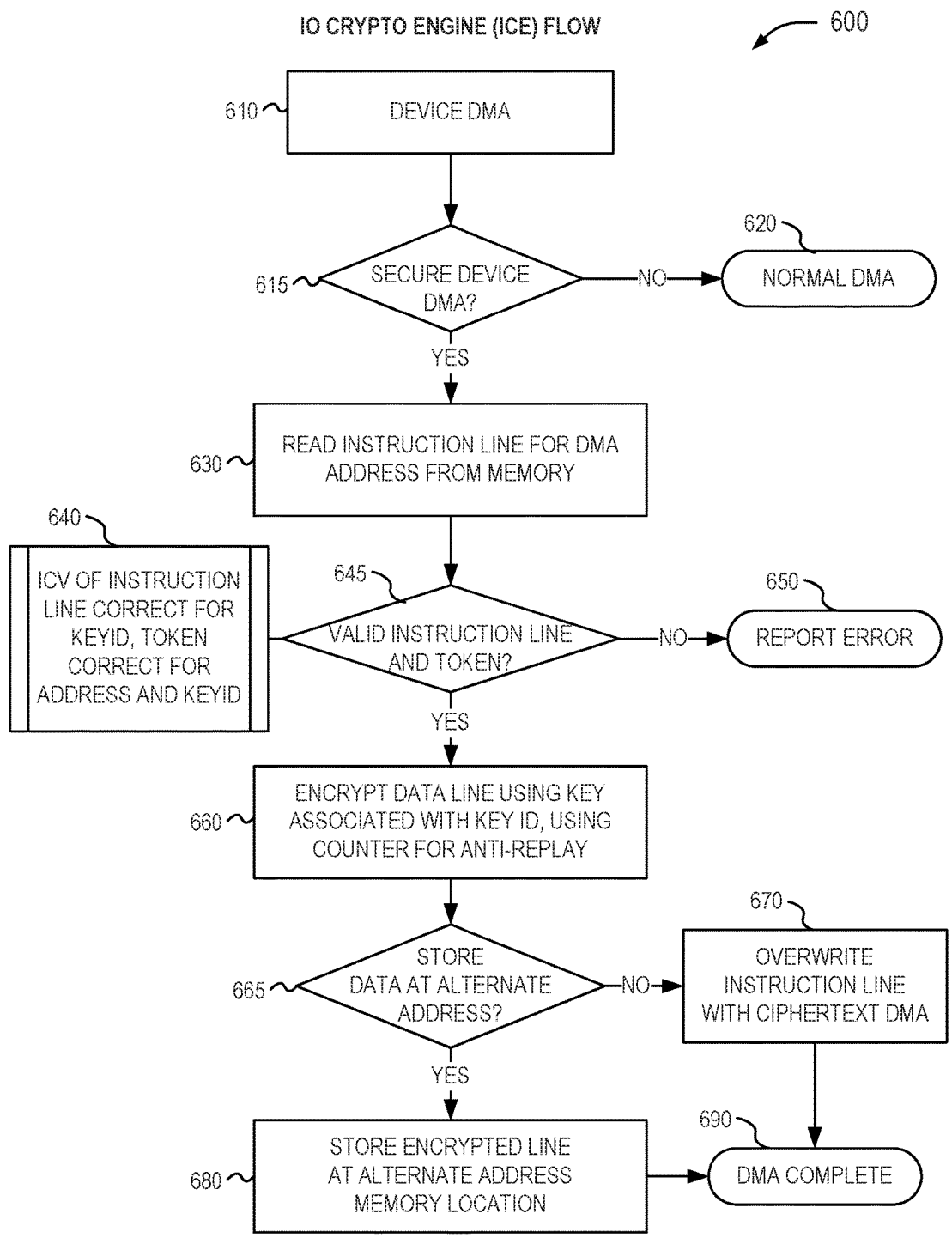
FIG. 6 illustrates a flowchart of a software write flow, adapted for use with the presently disclosed trusted IO techniques, according to an example.

FIG. 6 illustrates a flowchart 600 of a software write flow, adapted for use with the presently disclosed trusted IO techniques, according to an example. As shown, the following operations of flowchart 600 may be implemented by operations of a computing system in accordance with the data flows of FIGS. 1 to 3 to implement an ICE-based flow of secure DMA writes, although the technique of flowchart 600 may also be used with other varying configurations and data flows.

The flowchart 600 depicts a series of operations that originate from a Device DMA (operation 610). A determination is made whether the Device DMA is intended to be secure (decision 615). If the Device DMA is not intended to be secure, a normal DMA access to memory may be performed (result 620). If the Device DMA is intended to be secure, operations for a secure device DMA continue.

The operations for a secure device DMA include operations for reading an instruction line for the DMA from memory (operation 630), and retrieving data from this instruction line. As a result of the read of the data from instruction line, data for a token (e.g., an encrypted token) and data for an integrity check value of the instruction line may be extracted (data value 640). This data value may indicate whether the ICV of the instruction line is correct based on the KeyID of the secure key, and whether the token is correct based on the memory address and the KeyID of the secure key. A determination is then made whether the instruction line and token are valid for this secure DMA operation (decision 645). If the instruction line or token is not valid, the secure DMA operation may discontinue and an error may be reported (result 650). If the instruction line and token is valid, the secure DMA operation continues.

The secure DMA operation includes operations for encrypting the data (operation 660), which may include use of a secret key associated with the key ID, and a counter. The use of the counter is provided for an anti-replay mechanism, to modify the encryption to be specific to use of the counter that is known by the authorized software application.

The operations of the secure DMA conclude with operations to write the encrypted data into memory. A determination is made whether to store the encrypted data at an alternate address (decision 665). If data is not to be stored at the alternate address, the instruction line (previously used to store the token) is overwritten with the encrypted data (e.g., ciphertext) from the DMA operation (operation 670). If the data is to be stored at the alternate address, the encrypted data (e.g., ciphertext) is stored at the alternate memory address (operation 680).

As a result of the technique of flowchart 600, the software may setup instructions in memory for implementing a central crypto engine (e.g., ICE), where those instructions pertain to securing DMA from a device that needs to be protected. This technique further enables a mechanism for delivering Trusted IO in a cost-effective way that may apply generically to all devices, enables multiple different entities exclusive access to their IO streams, and provides strong security including confidentiality, integrity and anti-replay.

Existing techniques that attempt to implement trusted IO do not implement this level of bi-directional support for both secure writes and reads. For example, limited protections may be established for encrypted IO operations with ARM® TrustZone®, using the operating system to establish secure DMA channels. Such a mechanism works as long as the operating system is trusted. However, this security mechanism falls short in cases where the operating system is compromised. The presently described techniques enable an approach where the authorized (protected) software is trusted with the highest level of security, but other functions on the machine need not be trusted.

Thus, the configuration of the presently described ICE and data flows may manage all device states with a generic mechanism that is device independent and driven entirely, and securely, from trusted software in a TEE or other secure environment. Some of the examples of secure environments that may be used in connection with the execution of trusted software as previously described, include: an Intel® Software Guard Extensions (SGX) secure enclave, an ARM® TrustZone® TEE, a Virtual Machine, containers, Execute Only memory, and like secure endpoints; further, the presently disclosed techniques may also be extended to other variations of separate processes, OS kernels, privileged software, or separate cores, or embedded subsystems such as a Manageability Engine, or baseboard management controller (BMC).

The flexibility of the presently-described ICE approach is demonstrated by the ability to provide replay protection, integrity, independent multi-party security and other capabilities in a stateless manner, as state is directed and managed by the authorized software, and not the device or ICE. Moreover, the presently described approach for trusted IO enables maximum compatibility with existing software stacks, drivers, OSes, etc. without sacrificing security. The stateless property enables multiple non-trusting parties to securely interact with each other, and does not require a higher level of trust in the underlying system software such as the OS/VMM, or in associated applications operating in the underlying system software.

Figure 7:
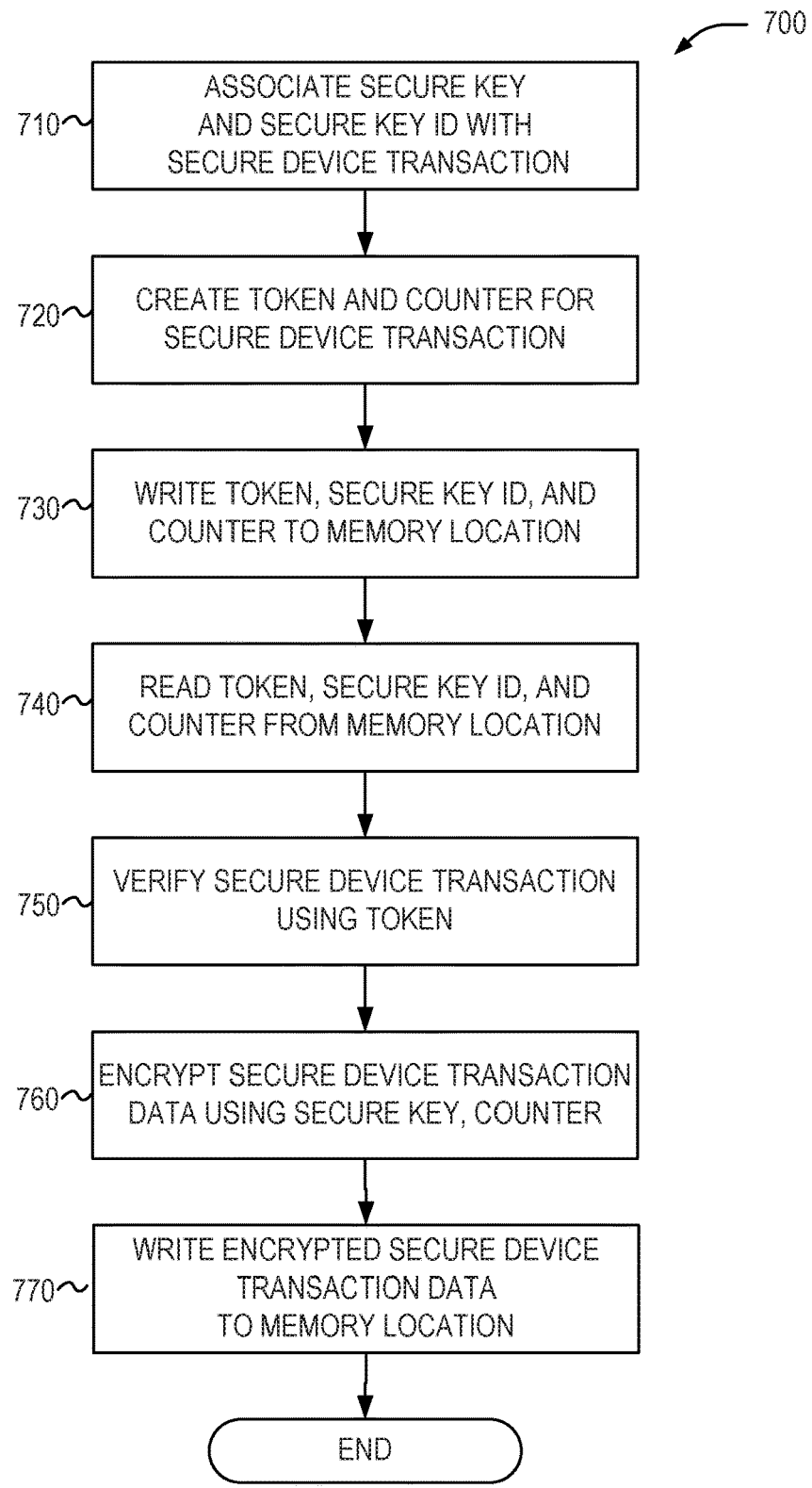
FIG. 7 illustrates a flowchart of an example method for storing and accessing trusted IO data, for implementation of the presently disclosed secure data configurations and flows, according to an example.

FIG. 7 illustrates a flowchart 700 of an example method for storing and accessing trusted IO data, for implementation of the presently disclosed secure data configurations and flows, according to an example. As shown, the following operations of flowchart 700 may be implemented by features of the aforementioned ICE, IOMMU, processor circuitry, memory circuitry, device circuitry, or other subsystems of a computing system. However, it will be understood that such operations of the flowchart 700 may refer to computer system operations as a whole, from a combination of one or more subsystems.

The flowchart 700 depicts operations occurring to access memory and write data into the memory for a secure device transaction (e.g., a secure DMA transaction with an input output device) storing encrypted data. It will be understood that the operations occurring to access memory and read data from the memory for the secure device transaction may be performed using corresponding techniques for decrypting the stored encrypted data.

As shown in flowchart 700, an operation is initially performed in the computing system for associating a secure key (e.g., an encryption key) and a key identifier of this secure key with a secure device transaction (operation 710). Additionally, an operation is performed to create a token and a counter for the secure device transaction (operation 720). The counter may be a value supplied from authorized software (or other trusted user) to receive data from the secure device transaction, as this counter may be establish as an anti-replay mechanism tied to the authorized software. The token may be a value supplied from a cryptographic engine and used to validate the secure device transaction as discussed below.

The operations of the flowchart 700 continue to write the token, the secure device identifier, and the counter to a memory location (operation 730) that is accessible during the secure device transaction. At the subsequent time when the secure device transaction occurs, the token, the secure device identifier, and the counter is retrieved from the memory location (operation 740). The secure device transaction is verified using the information in the token (operation 750), such as to verify that the device that is providing the data is secure and trusted (e.g., is not spoofed).

The operations of the flowchart 700 conclude by encrypting the secure device transaction data using the secure key (the secure key associated with the secure key identifier retrieved from memory) and the counter (the counter value retrieved from memory) (operation 760), and writing the encrypted secure device transaction data to a memory location (operation 770). This memory location may overwrite the previous memory location of the token/secure key identifier/and token, or may write to a new memory location (such as a new memory location indicated in the token).

In some examples, the presently described techniques may be extended to include protection for protected environments and trusted software operating in a remote or third party computing system. Thus, in an example, the preceding techniques may be used in connection with an enclave or other secure execution location operating in a remote cloud, which provides a suitable security profile for secure communications with the computing system. Likewise, any number of secure or trusted software features may be extended through the use of cryptography and secure communications.

Figure 8:
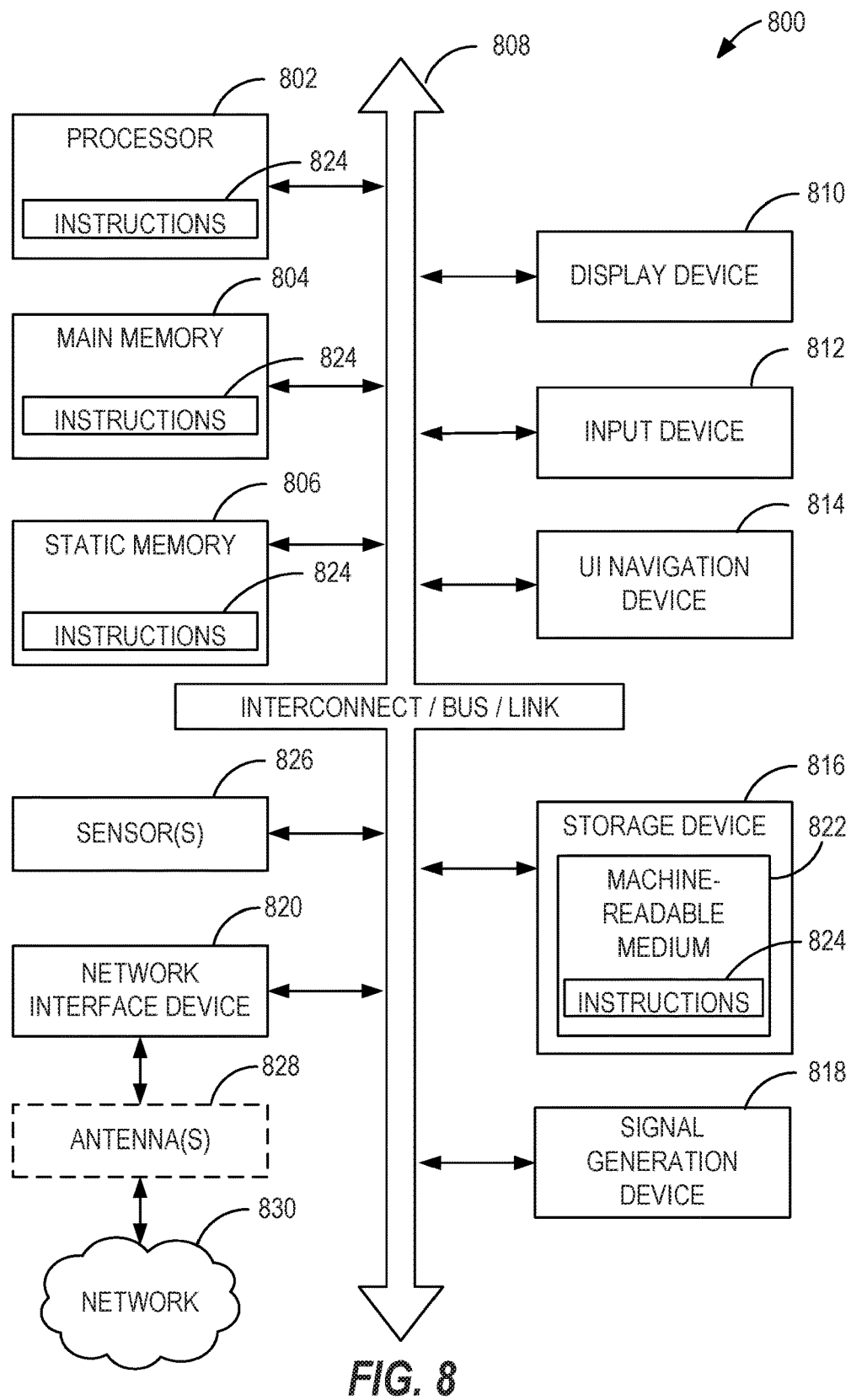
FIG. 8 illustrates a block diagram for an example computer architecture upon which any one or more of the techniques (e.g., operations, processes, methods, and methodologies) discussed herein may be performed, according to an example.

FIG. 8 is a block diagram illustrating a machine in the example form of a computer system 800, within which a set or sequence of instructions may be executed to cause the machine to perform any one of the methodologies discussed herein, according to an example embodiment. The machine may be a computing device embodying the techniques described above for one or multiple of FIGS. 1-7, such as a computing device embodied as a personal computer (PC), a tablet PC, a hybrid tablet/notebook PC, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via an interconnect 808 (e.g., a link, a bus, etc.). In some examples, such as in certain system-on-chip (SoC) configurations, the processor 802 and main memory 804 may be integrated into a single fabricated chip or circuitry, and may communicate with each other using an internal interface. The computer system 800 may further include a video display unit 810, an alphanumeric input device 812 (e.g., a keyboard), and a user interface (UI) navigation device 814 (e.g., a mouse). In an example, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820 (which may include or operably communicate with a network 830 using one or more antennas 828, transceivers, or other wireless communications hardware), and one or more sensors 826, such as a global positioning system (GPS) sensor, compass, accelerometer, gyroscope, magnetometer, location sensor, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 830 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic and software of a number of components, modules, or mechanisms. Such components are tangible entities (e.g., hardware and software-configured hardware) capable of performing specified operations and may be configured or arranged in a certain manner In an example, circuitry or circuit sets may be arranged (e.g., internally or with respect to external entities such as other circuitry or circuit sets) in a specified manner as such components. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the component may be embodied or programmed by instructions of a machine readable medium. In an example, software, when executed by the underlying hardware of the component, causes the hardware to perform the specified operations. Thus, such components, modules, or mechanisms are understood to encompass a tangible entity, be that an entity that is physically constructed, specifically configured, temporarily configured, adapted, or programmed to operate in a specified manner or to perform part or all of any operations described herein.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising: an input output memory management unit (IOMMU), coupled to volatile memory and an input output (IO) device, the IOMMU to manage a direct memory access (DMA) request from the IO device to the volatile memory, to commence a secure DMA transaction; and an input output crypto engine (ICE), coupled to the volatile memory, the ICE to: write, to the volatile memory, metadata to enable the secure DMA transaction; read, from the volatile memory, the metadata to enable the secure DMA transaction and verify the secure DMA transaction using the metadata read from the volatile memory; and encrypt data from the IO device to produce encrypted secure data for the secure DMA transaction, wherein the encryption of the data from the IO device includes use of the metadata read from the volatile memory In Example 2, the subject matter of Example 1 optionally includes, wherein operations of the ICE to write the metadata to enable the secure DMA transaction include operations to write a token and write a counter associated with the secure DMA transaction to the volatile memory, wherein operations of the ICE to read the metadata to enable the secure DMA transaction include operations to read the token and read the counter associated with the secure DMA transaction from the volatile memory, wherein operations of the ICE to verify the secure DMA transaction using the metadata read from the volatile memory include operations to verify the secure DMA transaction using information included in the token, and wherein the operations of the ICE to encrypt the data from the IO device include use of the counter associated with the secure DMA transaction to modify the encryption of the data of the IO device.

In Example 3, the subject matter of Example 2 optionally includes, wherein use of the counter associated with the secure DMA transaction to modify the encryption includes use of the counter in an XTS (XEX-based tweaked-codebook mode with ciphertext stealing encryption) encryption technique.

In Example 4, the subject matter of any one or more of Examples 2-3 optionally include, wherein the information included in the token includes an identifier of the IO device and an identifier of a secure key used to encrypt the data from the IO device.

In Example 5, the subject matter of any one or more of Examples 2-4 optionally include, wherein the counter is provided from operation of an authorized software enabled to access the data from the IO device, the authorized software executing in a trusted execution environment.

In Example 6, the subject matter of any one or more of Examples 1-5 optionally include, wherein the metadata to enable the secure DMA transaction that is written to and read from the volatile memory includes information generated for the secure DMA transaction including: a token, a counter, an integrity check value (ICV), and an identifier of a secure key used to encrypt the data from the IO device.

In Example 7, the subject matter of any one or more of Examples 1-6 optionally include, the ICE to additionally: create a secure key to encrypt the data from the IO device in the secure DMA transaction; associate the secure key with a secure key identifier; and store the secure key to encrypt the data from the IO device in the secure DMA transaction; wherein the metadata to enable the secure DMA transaction that is read from the volatile memory includes the secure key identifier; and wherein the use of the metadata read from the volatile memory includes use of the secure key identifier to retrieve the secure key, and encrypt the data from the IO device using the secure key.

In Example 8, the subject matter of Example 7 optionally includes, the IOMMU to additionally: verify an identifier of the IO device in a list of trusted IO devices, the list of trusted IO devices to identify the IO device as trusted to perform the secure DMA transaction.

In Example 9, the subject matter of any one or more of Examples 1-8 optionally include, wherein operations of the ICE to read the metadata to enable the secure DMA transaction from the volatile memory and verify the secure DMA transaction using the metadata read from the volatile memory, are further initiated in response to the IOMMU managing the request to commence the secure DMA transaction.

In Example 10, the subject matter of any one or more of Examples 1-9 optionally include, wherein operations of the ICE to verify the secure DMA transaction using the metadata read from the volatile memory include verifying an integrity check value (ICV) included in the metadata read from the volatile memory, the ICV associated with the secure DMA transaction.

In Example 11, the subject matter of any one or more of Examples 1-10 optionally include, the ICE to additionally write the encrypted secure data for the secure DMA transaction to the volatile memory, wherein operations of the ICE to write the metadata to enable the secure DMA transaction write the metadata to a memory location of the volatile memory, and wherein operations of the ICE to write the encrypted secure data for the secure DMA transaction write the encrypted secure data to the memory location of the volatile memory, to overwrite the metadata to enable the secure DMA transaction.

In Example 12, the subject matter of any one or more of Examples 1-11 optionally include, the ICE to additionally write the encrypted secure data for the secure DMA transaction to the volatile memory, wherein operations of the ICE to write the metadata to enable the secure DMA transaction write the metadata to a first memory location of the volatile memory, wherein operations of the ICE to write the encrypted secure data for the secure DMA transaction write the encrypted secure data to a second memory location of the volatile memory, and wherein the second memory location is indicated in the metadata to enable the secure DMA transaction.

Example 13 is at least one machine readable storage medium, comprising a plurality of instructions that, responsive to being executed with processor circuitry of a computing system, cause the computing system to perform operations that: write, to a memory of the computing system, metadata to enable a secure direct memory access (DMA) transaction for a device of the computing system; read, from the memory, the metadata to enable the secure DMA transaction and verify the secure DMA transaction using the metadata read from the memory, in response to the device attempting to perform the secure DMA transaction; and perform an encryption of data from the device to produce encrypted secure data for the secure DMA transaction, wherein the encryption of the data from the device includes use of the metadata read from the memory In Example 14, the subject matter of Example 13 optionally includes, wherein the operations to write the metadata to enable the secure DMA transaction include operations to write a token and write a counter associated with the secure DMA transaction to the memory, wherein the operations to read the metadata to enable the secure DMA transaction include operations to read the token and read the counter associated with the secure DMA transaction from the memory, wherein the operations to verify the secure DMA transaction using the metadata read from the memory include operations to verify the secure DMA transaction using information included in the token, and wherein the operations to perform the encryption of the data from the device include use of the counter associated with the secure DMA transaction to modify the encryption of the data of the device.

In Example 15, the subject matter of Example 14 optionally includes, wherein use of the counter associated with the secure DMA transaction to modify the encryption includes use of the counter in an XTS (XEX-based tweaked-codebook mode with ciphertext stealing encryption) encryption technique.

In Example 16, the subject matter of any one or more of Examples 14-15 optionally include, wherein the information included in the token includes an identifier of the device and an identifier of a secure key used to perform the encryption of the data from the device.

In Example 17, the subject matter of any one or more of Examples 14-16 optionally include, wherein the counter is provided from operation of an authorized software enabled to access the data from the device, the authorized software executing in a trusted execution environment of the computing system.

In Example 18, the subject matter of any one or more of Examples 13-17 optionally include, wherein the metadata to enable the secure DMA transaction that is written to and read from memory includes information generated for the secure DMA transaction including: a token, a counter, an integrity check value (ICV), and an identifier of a secure key used to perform the encryption of the data from the device.

In Example 19, the subject matter of any one or more of Examples 13-18 optionally include, wherein the instructions further cause the computing system to perform operations that: create a secure key to perform the encryption of the data from the device in the secure DMA transaction; associate the secure key with a secure key identifier; and store the secure key to perform the encryption of the data from the device in the secure DMA transaction in a crypto engine; wherein the metadata to enable the secure DMA transaction read from the memory includes the secure key identifier; and wherein the use of the metadata read from the memory includes use of the secure key identifier to retrieve the secure key from the crypto engine, and performance of the encryption of the data from the device with the crypto engine using the secure key.

In Example 20, the subject matter of Example 19 optionally includes, wherein the instructions further cause the computing system to perform operations that: verify an identifier of the device in a list of trusted IO devices, the list of trusted IO devices to identify the IO device as trusted to perform the secure DMA transaction; wherein the operations to create the secure key and verify the identifier of the device are performed by CPU microcode.

In Example 21, the subject matter of any one or more of Examples 13-20 optionally include, wherein the operations to read the metadata to enable the secure DMA transaction from the memory and verify the secure DMA transaction using the metadata read from the memory, are further initiated in response to handling of a request to perform the secure DMA transaction by an input output memory management unit of the computing system.

In Example 22, the subject matter of any one or more of Examples 13-21 optionally include, wherein the operations to perform the encryption of the data from the device and write the encrypted secure data to the memory are performed by an input output crypto engine.

In Example 23, the subject matter of any one or more of Examples 13-22 optionally include, wherein the operations to verify the secure DMA transaction using the metadata read from the memory includes operations to verify an integrity check value (ICV) included in the metadata read from the memory, the ICV associated with the secure DMA transaction.

In Example 24, the subject matter of any one or more of Examples 13-23 optionally include, wherein the instructions further cause the computing system to perform operations that write the encrypted secure data for the secure DMA transaction to the memory, wherein the operations to write the metadata to enable the secure DMA transaction write the metadata to a memory location, and wherein the operations to write the encrypted secure data for the secure DMA transaction write the encrypted secure data to the memory location, to overwrite the metadata to enable the secure DMA transaction.

In Example 25, the subject matter of any one or more of Examples 13-24 optionally include, wherein the instructions further cause the computing system to perform operations that write the encrypted secure data for the secure DMA transaction to the memory, wherein the operations to write the metadata to enable the secure DMA transaction write the metadata to a first memory location, wherein the operations to write the encrypted secure data for the secure DMA transaction write the encrypted secure data to a second memory location, and wherein the second memory location is indicated in the metadata to enable the secure DMA transaction.

Example 26 is a method, comprising electronic operations, which when performed by circuitry of a computing system, causes the computing system to perform the electronic operations including: writing, to a memory of the computing system, metadata to enable a secure direct memory access (DMA) transaction for a device of the computing system; reading, from the memory, the metadata to enable the secure DMA transaction and verifying the secure DMA transaction using the metadata read from the memory, in response to the device attempting to perform the secure DMA transaction; performing an encryption of data from the device to produce encrypted secure data for the secure DMA transaction, wherein the encryption of the data from the device includes use of the metadata read from the memory; and writing the encrypted secure data for the secure DMA transaction to the memory In Example 27, the subject matter of Example 26 optionally includes, wherein writing the metadata to enable the secure DMA transaction includes writing a token and writing a counter associated with the secure DMA transaction to the memory, wherein reading the metadata to enable the secure DMA transaction includes reading the token and reading the counter associated with the secure DMA transaction from the memory, wherein verifying the secure DMA transaction using the metadata read from the memory includes verifying the secure DMA transaction using information included in the token, and wherein performing an encryption of the data from the device includes use of the counter associated with the secure DMA transaction to modify the encryption of the data of the device.

In Example 28, the subject matter of Example 27 optionally includes, wherein use of the counter associated with the secure DMA transaction to modify the encryption includes use of the counter in an XTS (XEX-based tweaked-codebook mode with ciphertext stealing encryption) encryption technique.

In Example 29, the subject matter of any one or more of Examples 27-28 optionally include, wherein the information included in the token includes an identifier of the device and an identifier of a secure key used to perform the encryption of the data from the device.

In Example 30, the subject matter of any one or more of Examples 27-29 optionally include, wherein the counter is provided from operation of an authorized software enabled to access the data from the device, the authorized software executing in a trusted execution environment of the computing system.

In Example 31, the subject matter of any one or more of Examples 26-30 optionally include, wherein the metadata to enable the secure DMA transaction that is written to and read from memory includes information generated for the secure DMA transaction including: a token, a counter, an integrity check value (ICV), and an identifier of a secure key used to perform the encryption of the data from the device.

In Example 32, the subject matter of any one or more of Examples 26-31 optionally include, wherein the electronic operations of the method further include: creating a secure key to perform the encryption of the data from the device in the secure DMA transaction; associating the secure key with a secure key identifier; and storing the secure key to perform the encryption of the data from the device in the secure DMA transaction in a crypto engine; wherein the metadata to enable the secure DMA transaction read from the memory includes the secure key identifier; and wherein the use of the metadata read from the memory includes use of the secure key identifier to retrieve the secure key from the crypto engine, and performance of the encryption of the data from the device with the crypto engine using the secure key.

In Example 33, the subject matter of Example 32 optionally includes, wherein the electronic operations of the method further include: verifying an identifier of the device in a list of trusted IO devices, the list of trusted IO devices to identify the device as trusted to perform the secure DMA transaction; wherein the electronic operations to create the secure key and verify the identifier of the device are performed by CPU microcode.

In Example 34, the subject matter of any one or more of Examples 26-33 optionally include, wherein reading the metadata to enable the secure DMA transaction from the memory and verifying the secure DMA transaction using the metadata read from the memory, are further initiated in response to handling of a request to perform the secure DMA transaction by an input output memory management unit of the computing system.

In Example 35, the subject matter of any one or more of Examples 26-34 optionally include, wherein verifying the secure DMA transaction using the metadata read from the memory includes verifying an integrity check value (ICV) included in the metadata read from the memory, the ICV associated with the secure DMA transaction.

In Example 36, the subject matter of any one or more of Examples 26-35 optionally include, wherein writing the metadata to enable the secure DMA transaction writes the metadata to a memory location, and wherein writing the encrypted secure data for the secure DMA transaction writes the encrypted secure data to the memory location, thereby overwriting the metadata to enable the secure DMA transaction.

In Example 37, the subject matter of any one or more of Examples 26-36 optionally include, wherein writing the metadata to enable the secure DMA transaction writes the metadata to a first memory location, wherein writing the encrypted secure data for the secure DMA transaction writes the encrypted secure data to a second memory location, and wherein the second memory location is indicated in the metadata to enable the secure DMA transaction.

Example 38 is a machine readable medium including instructions, which when executed by a computing system, cause the computing system to perform any of the methods of Examples 26-37.

Example 39 is an apparatus comprising means for performing any of the methods of Examples 26-37.

Example 40 is an apparatus, comprising: means for writing, to a memory, information to enable a secure direct memory access (DMA) transaction for an input output (IO) device; means for reading, from the memory, the information to enable the secure DMA transaction and verifying the secure DMA transaction using the information read from the memory, in response to the IO device attempting to perform the secure DMA transaction; means for performing an encryption of data from the IO device to produce encrypted secure data for the secure DMA transaction, wherein the encryption of the data from the IO device includes use of the information read from the memory; and means for writing the encrypted secure data for the secure DMA transaction to the memory.

In Example 41, the subject matter of Example 40 optionally includes, means for writing a token and writing a counter associated with the secure DMA transaction to the memory, means for reading the token and reading the counter associated with the secure DMA transaction from the memory, means for verifying the secure DMA transaction using information included in the token, and means for performing an encryption of the data from the IO device using the counter associated with the secure DMA transaction to modify the encryption of the data of the IO device.

In Example 42, the subject matter of Example 41 optionally includes, means for modifying the encryption by using the counter in an XTS (XEX-based tweaked-codebook mode with ciphertext stealing encryption) encryption technique.

In Example 43, the subject matter of any one or more of Examples 41-42 optionally include, means for including an identifier of the IO device and an identifier of a secure key used to perform the encryption of the data from the IO device in the information included in the token.

In Example 44, the subject matter of any one or more of Examples 41-43 optionally include, means for providing the counter from operation of an authorized software enabled to access the data from the IO device, the authorized software executing in a trusted execution environment.

In Example 45, the subject matter of any one or more of Examples 40-44 optionally include, means for including information generated for the secure DMA transaction to the secure DMA transaction that is written to and read from memory, to include: a token, a counter, an integrity check value (ICV), and an identifier of a secure key used to perform the encryption of the data from the IO device.

In Example 46, the subject matter of any one or more of Examples 40-45 optionally include, means for creating a secure key to perform the encryption of the data from the IO device in the secure DMA transaction; means for associating the secure key with a secure key identifier; means for storing the secure key to perform the encryption of the data from the IO device in the secure DMA transaction in a crypto engine; means for including the secure key identifier in the information to enable the secure DMA transaction; and means for using the information read from the memory to use of the secure key identifier to retrieve the secure key from the crypto engine, and perform of the encryption of the data from the IO device with the crypto engine using the secure key.

In Example 47, the subject matter of Example 46 optionally includes, means for identifying the IO device as trusted to perform the secure DMA transaction with the IO device.

In Example 48, the subject matter of any one or more of Examples 40-47 optionally include, means for verifying an integrity check value (ICV) included in the information read from the memory, the ICV associated with the secure DMA transaction.

In Example 49, the subject matter of any one or more of Examples 40-48 optionally include, means for writing the information to enable the secure DMA transaction by writing the information to a memory location; and means for writing the encrypted secure data for the secure DMA transaction by writing the encrypted secure data to the memory location, thereby overwriting the information to enable the secure DMA transaction.

In Example 50, the subject matter of any one or more of Examples 40-49 optionally include, means for writing the information to enable the secure DMA transaction by writing the information to a first memory location; and means for writing the encrypted secure data for the secure DMA transaction by writing the encrypted secure data to a second memory location, wherein the second memory location is indicated in the information to enable the secure DMA transaction.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. At least one non-transitory machine readable storage medium, comprising a plurality of instructions that, responsive to being executed with processor circuitry of a computing system, cause the computing system to perform operations that:

write, to a memory of the computing system, a metadata set, comprising a respective metadata entry for each trusted device of the computing system, wherein the metadata entry includes a key identifier which identifies a key used for encryption and a device identifier for the trusted device, wherein a respective trusted device is a device configured to perform secure direct memory access (DMA) transactions, and wherein a secure DMA transaction is a memory operation that is cryptographically secure and unusable by unintended parties;

receive a request for a secure DMA transaction from a requesting device;

read, from the memory, a metadata entry, from the metadata set, corresponding to the requesting device to enable the secure DMA transaction;

obtain an encryption key using the key identifier included in the metadata entry corresponding to the requesting device;

verify the secure DMA transaction using the metadata entry corresponding to the requesting device read from the memory, wherein the operations to verify include operations to evaluate a device identifier of the requesting device attempting to perform the secure DMA transaction and the device identifier included in the metadata entry corresponding to the requesting device read from the memory;

perform, using the key, an encryption of data from the requesting device to produce encrypted secure data in response to the secure DMA transaction, wherein the encryption of the data from the requesting device includes use of the metadata entry corresponding to the requesting device read from the memory; and write, with the secure DMA transaction, the encrypted secure data to the memory.

2. The machine readable storage medium of claim 1, wherein the operations to receive the request for the secure DMA transaction include operations to write a token and write a counter associated with the secure DMA transaction to the memory, wherein the operations to read the metadata entry include operations to read the token and read the counter associated with the secure DMA transaction from the memory, wherein the operations to verify the secure DMA transaction using the metadata entry corresponding to the requesting device include operations to verify the secure DMA transaction using information included in the token, and wherein the operations to perform the encryption of the data from the requesting device include use of the counter associated with the secure DMA transaction to modify the encryption of the data of the requesting device.

3. The machine readable storage medium of claim 2, wherein use of the counter associated with the secure DMA transaction to modify the encryption includes use of the counter in an XTS (XEX-based tweaked-codebook mode with ciphertext stealing encryption) encryption technique.

4. The machine readable storage medium of claim 2, wherein the counter is provided from operation of an authorized software enabled to access the data from the requesting device, the authorized software executing in a trusted execution environment of the computing system.

5. The machine readable storage medium of claim 1, wherein the metadata entry that is written to and read from memory includes information generated for the secure DMA transaction including: a token, a counter, an integrity check value (ICV), and an identifier of a secure key used to perform the encryption of the data from the requesting device.

6. The machine readable storage medium of claim 1, wherein the instructions further cause the computing system to perform operations that:

create a secure key to perform the encryption of the data from the respective trusted device;

associate the secure key with a secure key identifier;

write the secure key identifier to the metadata entry of the respective trusted device; and store the secure key to perform the encryption of the data from the respective trusted device in the secure DMA transaction in a crypto engine;

wherein the metadata entry read from the memory includes the secure key identifier; and wherein the use of the metadata entry read from the memory includes use of the secure key identifier to retrieve the secure key from the crypto engine, and performance of the encryption of the data from the requesting device with the crypto engine using the secure key.

7. The machine readable storage medium of claim 6, wherein the instructions further cause the computing system to perform operations that:

verify an identifier of the requesting device in a list of trusted IO devices, the list of trusted IO devices to identify the IO device as trusted to perform the secure DMA transaction;

wherein the operations to create the secure key and verify the identifier of the requesting device are performed by CPU microcode.

8. The machine readable storage medium of claim 1, wherein the operations to read the metadata entry corresponding to the requesting device to enable the secure DMA transaction from the memory and verify the secure DMA transaction using the metadata entry corresponding to the requesting device read from the memory, are further initiated in response to handling of a request to perform the secure DMA transaction by an input output memory management unit of the computing system.

9. The machine readable storage medium of claim 1, wherein the operations to perform the encryption of the data from the requesting device and write the encrypted secure data to the memory are performed by an input output crypto engine.

10. The machine readable storage medium of claim 1, wherein the operations to verify the secure DMA transaction using the metadata entry corresponding to the requesting device read from the memory includes operations to verify an integrity check value (ICV) included in the metadata entry corresponding to the requesting device read from the memory, the ICV associated with the secure DMA transaction.

11. The machine readable storage medium of claim 1, wherein the instructions further cause the computing system to perform operations that write the encrypted secure data for the secure DMA transaction to the memory, wherein the operations to write the respective metadata entry of the metadata set writes the respective metadata entry to a memory location, and wherein the operations to write the encrypted secure data for the secure DMA transaction writes the encrypted secure data to the memory location, to overwrite the respective metadata entry to enable the secure DMA transaction.

12. The machine readable storage medium of claim 1, wherein the operations to write the metadata set writes the respective metadata entry to a first memory location, wherein the operations to write the encrypted secure data for the secure DMA transaction writes the encrypted secure data to a second memory location, and wherein the second memory location is indicated in the respective metadata entry to enable the secure DMA transaction.

13. An apparatus, comprising:

an input output memory management unit (IOMMU) circuit, coupled to volatile memory and at least one input output (IO) device, the IOMMU circuit to manage a direct memory access (DMA) request from the at least one IO device to the volatile memory, to commence a secure DMA transaction; and an input output crypto engine (ICE) circuit, coupled to the volatile memory, the ICE circuit to:

write, to the volatile memory, a metadata set, comprising a respective metadata entry for each IO device, wherein the metadata entry includes a key identifier which identifies a key used for encryption and a device identifier for the IO device, wherein a respective IO device is a device configured to perform secure direct memory access (DMA) transactions, and wherein a secure DMA transaction is a memory operation that is cryptographically secure and unusable by unintended parties;

receive a request for a secure DMA transaction from a requesting IO device;

read, from the volatile memory, a metadata entry, from the metadata set, corresponding to the requesting IO device to enable the secure DMA transaction;

obtain an encryption key using the key identifier included in the metadata entry corresponding to the requesting IO device;

verify the secure DMA transaction using the metadata entry corresponding to the requesting device read from the volatile memory, wherein the operations to verify include operations to evaluate a device identifier of the requesting IO device attempting to perform the secure DMA transaction and the device identifier included in the metadata entry corresponding to the requesting IO device read from the volatile memory;

encrypt, using the key, data from the requesting IO device to produce encrypted secure data in response to the secure DMA transaction, wherein the encryption of the data from the requesting IO device includes use of the metadata entry corresponding to the requesting IO device read from the volatile memory; and write, with the secure DMA transaction, the encrypted secure data to the volatile memory.

14. The apparatus of claim 13, further comprising:
wherein operations of the ICE circuit to receive the request for the secure DMA transaction include operations to write a token and write a counter associated with the secure DMA transaction to the volatile memory, wherein operations of the ICE circuit to read the metadata entry include operations to read the token and read the counter associated with the secure DMA transaction from the volatile memory, wherein operations of the ICE circuit to verify the secure DMA transaction using the metadata entry corresponding to the requesting IO device include operations to verify the secure DMA transaction using information included in the token, and wherein the operations of the ICE circuit to encrypt the data from the requesting IO device include use of the counter associated with the secure DMA transaction to modify the encryption of the data of the requesting IO device.

15. The apparatus of claim 14,
wherein use of the counter associated with the secure DMA transaction to modify the encryption includes use of the counter in an XTS (XEX-based tweaked-codebook mode with ciphertext stealing encryption) encryption technique.

16. The apparatus of claim 14,
wherein the counter is provided from operation of an authorized software enabled to access the data from the requesting IO device, the authorized software executing in a trusted execution environment.

17. The apparatus of claim 13,
wherein the metadata entry that is written to and read from the volatile memory includes information generated for the secure DMA transaction including: a token, a counter, an integrity check value (ICV), and an identifier of a secure key used to encrypt the data from the requesting IO device.

18. The apparatus of claim 13, the ICE circuit to additionally:
create a secure key to encrypt the data from the respective IO device;
associate the secure key with a secure key identifier;
write the secure key identifier to the metadata entry of the respective IO device; and
store the secure key to encrypt the data from the respective IO device in the secure DMA transaction;
wherein the metadata entry that is read from the volatile memory includes the secure key identifier; and
wherein the use of the metadata entry read from the volatile memory includes use of the secure key identifier to retrieve the secure key, and encrypt the data from the requesting IO device using the secure key.

19. The apparatus of claim 18, the IOMMU circuit to additionally:
verify an identifier of the requesting IO device in a list of trusted IO devices, the list of trusted IO devices to identify the IO device as trusted to perform the secure DMA transaction.

20. The apparatus of claim 13,
wherein operations of the ICE circuit to read the metadata entry corresponding to the requesting IO device to enable the secure DMA transaction from the volatile memory and verify the secure DMA transaction using the metadata entry corresponding to the requesting IO device read from the volatile memory, are further initiated in response to the IOMMU circuit managing the request to commence the secure DMA transaction.

21. The apparatus of claim 13, the ICE circuit to additionally write the encrypted secure data for the secure DMA transaction to the volatile memory,
wherein operations of the ICE circuit to write the respective metadata entry of the metadata set writes the respective metadata entry to a memory location of the volatile memory, and
wherein operations of the ICE circuit to write the encrypted secure data for the secure DMA transaction writes the encrypted secure data to the memory location of the volatile memory, to overwrite the respective metadata entry to enable the secure DMA transaction.

22. The apparatus of claim 13, the ICE circuit to additionally write the encrypted secure data for the secure DMA transaction to the volatile memory,
wherein operations of the ICE circuit to write the metadata set writes the respective metadata entry to a first memory location of the volatile memory,
wherein operations of the ICE circuit to write the encrypted secure data for the secure DMA transaction writes the encrypted secure data to a second memory location of the volatile memory, and
wherein the second memory location is indicated in the respective metadata entry to enable the secure DMA transaction.

23. A method, comprising electronic operations, which when performed by circuitry of a computing system, causes the computing system to perform the electronic operations including:
- writing, to a memory of the computing system, a metadata set, comprising a respective metadata entry for each trusted device of the computing system, wherein the metadata entry includes a key identifier which identifies a key used for encryption and a device identifier for the trusted device, wherein a respective trusted device is a device configured to perform secure direct memory access (DMA) transactions, and wherein a secure DMA transaction is a memory operation that is cryptographically secure and unusable by unintended parties;
- receiving a request for a secure DMA transaction from a requesting device;
- reading, from the memory, a metadata entry, from the metadata set, corresponding to the requesting device to enable the secure DMA transaction;
- obtaining an encryption key using the key identifier included in the metadata entry corresponding to the requesting device;
- verifying the secure DMA transaction using the metadata entry corresponding to the requesting device read from the memory, wherein the verifying includes evaluating a device identifier of the requesting device attempting to perform the secure DMA transaction and the device identifier included in the metadata entry corresponding to the requesting device read from the memory;
- performing, using the key, an encryption of data from the requesting device to produce encrypted secure data in response to the secure DMA transaction, wherein the encryption of the data from the requesting device includes use of the metadata entry corresponding to the requesting device read from the memory; and
- writing the encrypted secure data for the secure DMA transaction to the memory.

24. The method of claim 23,
- wherein receiving the request for the secure DMA transaction includes writing a token and writing a counter associated with the secure DMA transaction to the memory,
- wherein reading the metadata entry includes reading the token and reading the counter associated with the secure DMA transaction from the memory,
- wherein verifying the secure DMA transaction using the metadata entry corresponding to the requesting device includes verifying the secure DMA transaction using information included in the token, and
- wherein performing an encryption of the data from the requesting device includes use of the counter associated with the secure DMA transaction to modify the encryption of the data of the requesting device.

25. The method of claim 23, wherein the electronic operations of the method further include:
- creating a secure key to perform the encryption of the data from the respective trusted device;
- associating the secure key with a secure key identifier;
- writing the secure key identifier to the metadata entry of the respective trusted device; and
- storing the secure key to perform the encryption of the data from the respective trusted device in the secure DMA transaction in a crypto engine;
- wherein the metadata entry read from the memory includes the secure key identifier; and
- wherein the use of the metadata entry read from the memory includes use of the secure key identifier to retrieve the secure key from the crypto engine, and performance of the encryption of the data from the requesting device with the crypto engine using the secure key.

* * * * *